US012633057B2

(12) United States Patent
Cheng et al.

(10) Patent No.: US 12,633,057 B2
(45) Date of Patent: May 19, 2026

(54) EXTRACTING 3D SHAPES FROM LARGE-SCALE UNANNOTATED IMAGE DATASETS

(71) Applicant: ADOBE INC., San Jose, CA (US)

(72) Inventors: Ta-Ying Cheng, Oxford (GB);
Matheus Gadelha, San Jose, CA (US);
Soren Pirk, Palo Alto, CA (US);
Radomir Mech, Mountain View, CA
(US); Thibault Groueix, San Francisco,
CA (US)

(73) Assignee: ADOBE INC., San Jose, CA (US)

( * ) Notice: Subject to any disclaimer, the term of this
patent is extended or adjusted under 35
U.S.C. 154(b) by 229 days.

(21) Appl. No.: 18/451,961

(22) Filed: Aug. 18, 2023

(65) Prior Publication Data

US 2025/0061660 A1 Feb. 20, 2025

(51) Int. Cl.
*G06T 17/20* (2006.01)
*G06V 10/46* (2022.01)
*G06V 10/762* (2022.01)

(52) U.S. Cl.
CPC ............ *G06T 17/20* (2013.01); *G06V 10/462*
(2022.01); *G06V 10/762* (2022.01)

(58) Field of Classification Search
None
See application file for complete search history.

(56) References Cited

U.S. PATENT DOCUMENTS

2019/0051036 A1* 2/2019 Matsunobu ............. G06T 17/00

OTHER PUBLICATIONS

Wei et al., Self-supervised Neural Articulated Shape and Appearance Models, 2022 IEEE/CVF Conference on Computer Vision and Pattern Recognition (CVPR), DOI 10.1109/CVPR52688.2022.01536, pp. 15795-15805 (Year: 2022).*
Grauman et al., Unsupervised Learning of Categories from Sets of Partially Matching Image Features, 2006 IEEE Computer Society Conference on Computer Vision and Pattern Recognition (CVPR'06) vol. 1, 2006, pp. 19-25 (Year: 2006).*
Marques et al., Estimating 3D shape from degenerate sequences with missing data, Computer Vision and Image Understanding 113 (2) (2009) 261-272 (Year: 2009).*

(Continued)

*Primary Examiner* — Kee M Tung
*Assistant Examiner* — Biao Chen
(74) *Attorney, Agent, or Firm* — F. CHAU & ASSOCIATES, LLC

(57) ABSTRACT

Systems and methods for extracting 3D shapes from unstructured and unannotated datasets are described. Embodiments are configured to obtain a first image and a second image, where the first image depicts an object and the second image includes a corresponding object of a same object category as the object. Embodiments are further configured to generate, using an image encoder, image features for portions of the first image and for portions of the second image; identify a keypoint correspondence between a first keypoint in the first image and a second keypoint in the second image by clustering the image features corresponding to the portions of the first image and the portions of the second image; and generate, using an occupancy network, a 3D model of the object based on the keypoint correspondence.

16 Claims, 9 Drawing Sheets

(56)　　　　References Cited

OTHER PUBLICATIONS

Lei et al., Learning and Meshing from Deep Implicit Surface Networks Using an Efficient Implementation of Analytic Marching, arXiv: 2106.10031v1 [cs.CV] Jun. 18, 2021 (Year: 2021).*

Mescheder et al., Occupancy Networks: Learning 3D Reconstruction in Function Space, 2019 IEEE/CVF Conference on Computer Vision and Pattern Recognition (CVPR), DOI Bookmark: 10.1109/CVPR.2019.00459, pp. 4455-4465 (Year: 2019).*

Meng et al., GNeRF: GAN-based Neural Radiance Field without Posed Camera, 2021 IEEE/CVF International Conference on Computer Vision (ICCV), DOI 10.1109/ICCV48922.2021.00629, pp. 6331-6341 (Year: 2021).*

Parkhi et al., Cats and Dogs, 2012 IEEE Conference on Computer Vision and Pattern Recognition pp. 3498-3505, 2012, "Parkhi"), (Year: 2012).*

Caron, et al., "Emerging Properties in Self-Supervised Vision Transformers", arXiv preprint arXiv:2104.14294v2 [cs.CV] May 24, 2021, 21 pages.

Longuet-Higgins, "A computer algorithm for reconstructing a scene from two projections", in Macmillan Journals Ltd, Nature vol. 293, Sep. 10, 1981, pp. 133-135.

Martin-Brualla, et al., "NeRF in the Wild: Neural Radiance Fields for Unconstrained Photo Collections", arXiv preprint arXiv:2008.02268v3 [cs.CV] Jan. 6, 2021, pp. 1-15.

Lin, et al., "BARF: Bundle-Adjusting Neural Radiance Fields", arXiv preprint arXiv:2104.06405v2 [cs.CV] Aug. 19, 2021, pp. 1-15.

Chang, et al., "ShapeNet: An Information-Rich 3D Model Repository", arXiv preprint arXiv:1512.03012v1 [cs.GR] Dec. 9, 2015, pp. 1-11.

Amir, et al., "Deep ViT Features as Dense Visual Descriptors", arXiv preprint arXiv:2112.05814v3 [cs.CV] Oct. 15, 2022, 17 pages.

Qin, et al., "Highly Accurate Dichotomous Image Segmentation", arXiv preprint arXiv:2203.03041v4 [cs.CV] Jul. 15, 2022, pp. 1-29.

* cited by examiner

400

Shape
Extraction
Apparatus
405

410

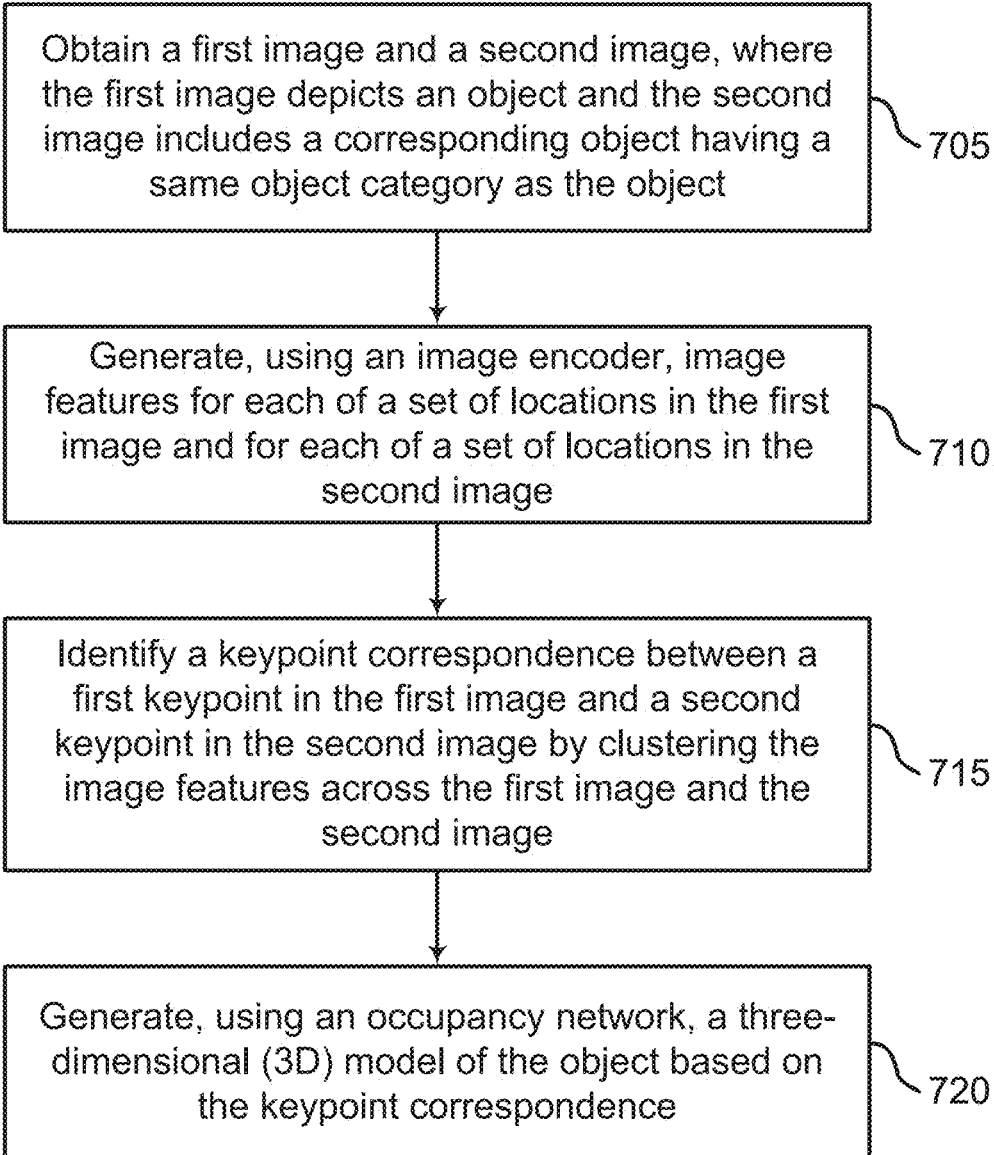

Obtain a first image and a second image, where the first image depicts an object and the second image includes a corresponding object having a same object category as the object ⟍705

Generate, using an image encoder, image features for each of a set of locations in the first image and for each of a set of locations in the second image ⟍710

Identify a keypoint correspondence between a first keypoint in the first image and a second keypoint in the second image by clustering the image features across the first image and the second image ⟍715

Generate, using an occupancy network, a three-dimensional (3D) model of the object based on the keypoint correspondence ⟍720

FIG. 7

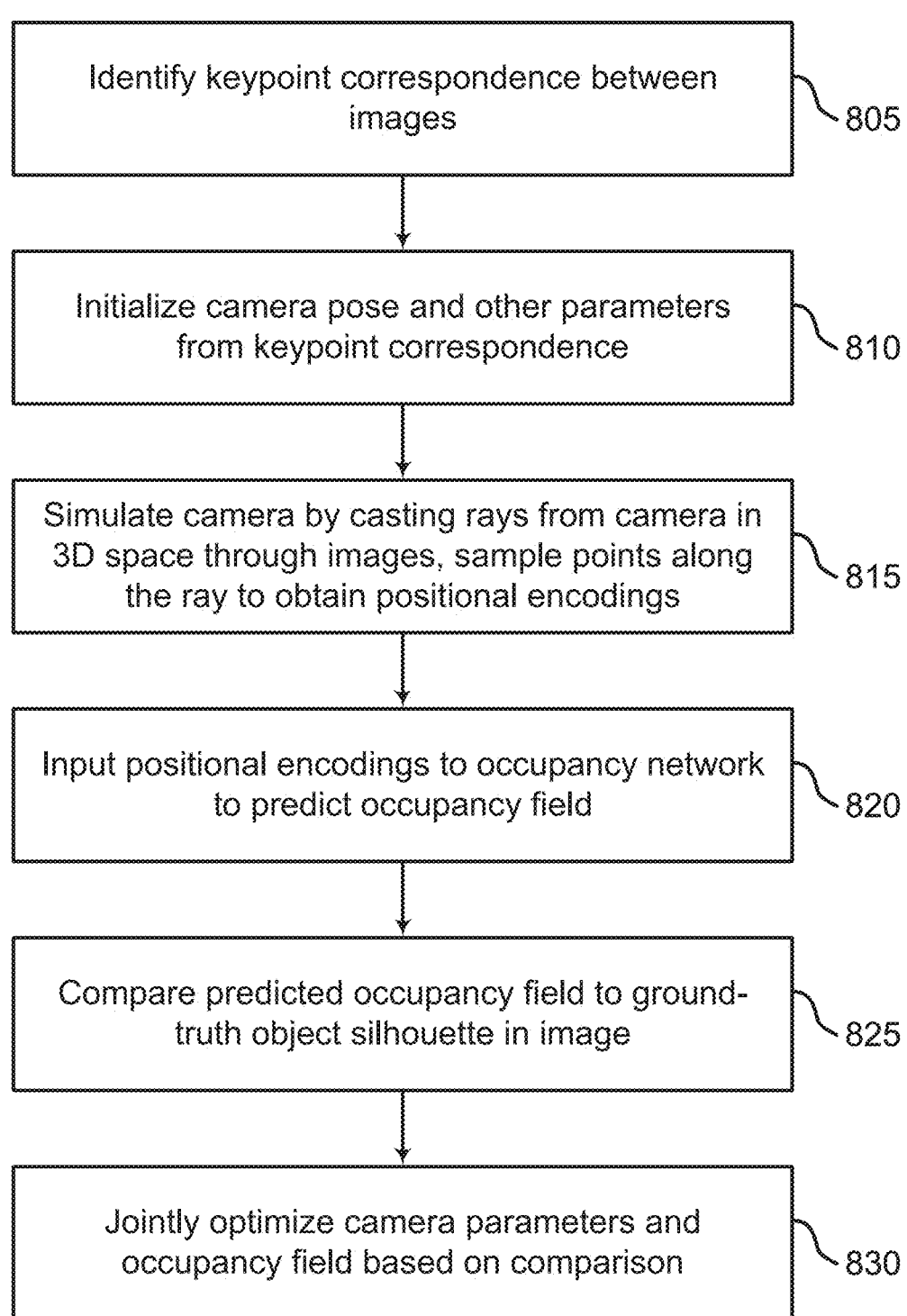

Identify keypoint correspondence between images — 805

Initialize camera pose and other parameters from keypoint correspondence — 810

Simulate camera by casting rays from camera in 3D space through images, sample points along the ray to obtain positional encodings — 815

Input positional encodings to occupancy network to predict occupancy field — 820

Compare predicted occupancy field to ground-truth object silhouette in image — 825

Jointly optimize camera parameters and occupancy field based on comparison — 830

EXTRACTING 3D SHAPES FROM LARGE-SCALE UNANNOTATED IMAGE DATASETS

BACKGROUND

The following relates generally to image processing and computer vision, and more specifically to extracting shape data from images. Image processing and computer vision focus on how machines can understand, interpret, and interact with visual data. At the heart of this discipline is the development of algorithms that can transform an input image into a more usable form, or extract meaningful information therefrom. These algorithms can range from simple tasks such as image enhancement and noise reduction, to more complex tasks such as object detection, face recognition, and semantic segmentation. Image processing forms the foundation for computer vision, enabling machines to mimic human visual perception and interpret the world in a structured and meaningful way.

Computer vision offers a wide array of techniques and methodologies for deriving 3D shape data from images. The process often involves converting 2D image data into a 3D representation, a task which requires a deep understanding of both geometry and the way light interacts with objects. Techniques such as stereopsis, structure from motion, and photogrammetry use multiple images of a scene taken from different perspectives to infer depth and reconstruct the 3D structure of a scene. However, these approaches assume controlled input data with a custom and highly coherent series of images for each shape.

SUMMARY

Systems and methods for extracting shape data from a plurality of images are described. For example, embodiments are configured to extract shapes from large, unstructured, and unannotated image datasets. Embodiments include an image encoder configured to generate image features for each of a plurality of locations from each of a plurality of images. Embodiments further include a keypoint extractor configured to identify a keypoint correspondence within the plurality of images based on the image features. For example, for a shape such as an office chair, the keypoint correspondence may identify sections of each image that correspond to an arm rest, a seat, a base, etc., such that a section is identified in each image for each keypoint. Embodiments may then predict a neural occupancy field for the shape by, for example simulating a light path between a camera and the image, sampling positional encodings along the light path, and inputting the positional encodings into a machine learning model (e.g., an occupancy network) to generate an occupancy field. The occupancy field may then be converted to another form of 3D model, such as a mesh, a set of voxels, or the like.

A method, apparatus, non-transitory computer readable medium, and system for extracting shape data from images are described. One or more aspects of the method, apparatus, non-transitory computer readable medium, and system include obtaining a first image and a second image, wherein the first image depicts an object and the second image includes a corresponding object having a same object category as the object; generating, using an image encoder, a first plurality of image feature vectors and a second plurality of image feature vectors, wherein the first plurality of image feature vectors correspond to a plurality of portions of the first image, respectively, and the second plurality of image feature vectors correspond to a plurality of portions of the second image, respectively; identifying a keypoint correspondence between a first keypoint in the first image and a second keypoint in the second image by clustering the first plurality of image feature vectors and the second plurality of image feature vectors; and generating, using a machine learning model, a three-dimensional (3D) model of the object based on the keypoint correspondence.

A non-transitory computer readable medium storing code, the code comprising instructions executable by a processor, is described. One or more aspects of the non-transitory computer readable medium include code executable by the processor to obtain a first image and a second image, wherein the first image depicts an object and the second image includes a corresponding object having a same object category as the object; generate, using an image encoder, image features for portions of the first image and for portions of the second image; identify a keypoint correspondence between a first keypoint in the first image and a second keypoint in the second image by clustering the image features corresponding to the portions of the first image and the portions of the second image; and generate, using a machine learning model, a three-dimensional (3D) model of the object based on the keypoint correspondence.

An apparatus, system, and method for extracting shape data from images are described. One or more aspects of the apparatus, system, and method include at least one processor; at least one memory including instructions executable by the at least one processor; an image encoder comprising parameters stored in the at least one memory and trained to generate image features for portions of a first image and portions of a second image, wherein the first image depicts an object and the second image includes a corresponding object having a same object category as the object; a keypoint extractor comprising parameters stored in the at least one memory and configured to identify a keypoint correspondence between a first keypoint in the first image and a second keypoint in the second image by clustering image features corresponding to the portions of the first image and the portions of the second image; and a machine learning model comprising parameters stored in the at least one memory and trained to generate a 3D model of the object based on the keypoint correspondence.

BRIEF DESCRIPTION OF THE DRAWINGS

FIG. 7 shows an example of a method for generating a 3D model from images according to aspects of the present disclosure.

FIG. 8 shows an example of a method for estimating a 3D shape from images using an occupancy network according to aspects of the present disclosure.

FIG. 9 shows an example of a computing device according to aspects of the present disclosure.

DETAILED DESCRIPTION

Figure 1:
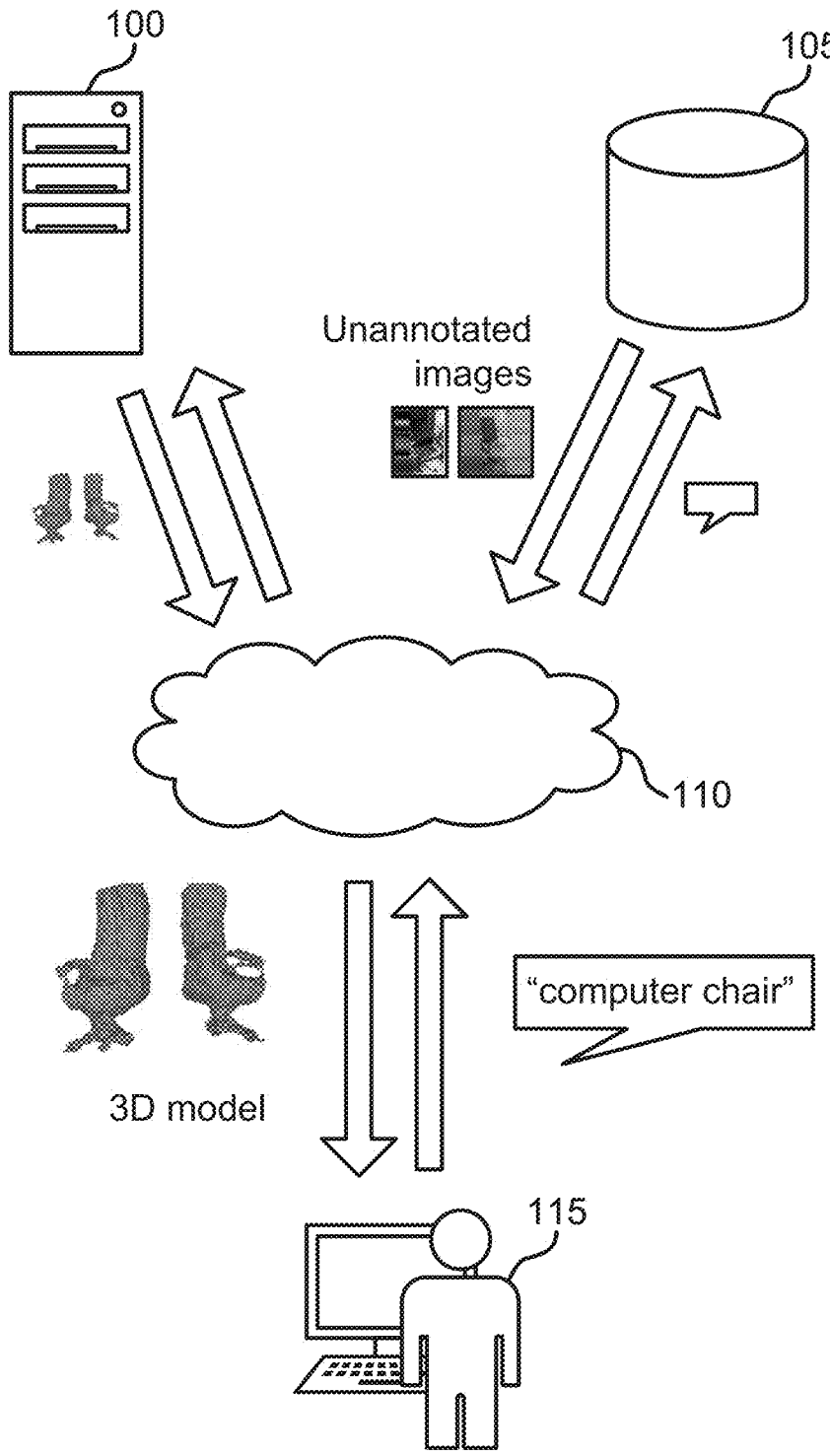
FIG. 1 shows an example of a shape extraction system according to aspects of the present disclosure.

Image processing and computer vision are used to transform visual data into machine-interpretable formats, and enabling machines to understand and interact with their environment visually. Image processing ranges from tasks like noise reduction, image enhancement, and color correction, to more intricate tasks that mimic human visual perception. Tasks such as object recognition, semantic segmentation, and scene understanding lie at the intersection of image processing and computer vision, demonstrating how machines can convert raw visual information into meaningful constructs.

Extracting shape data from images has been a central focus in computer vision. Conventional techniques like stereopsis, structure from motion, and photogrammetry utilize geometry and infer depth information and reconstruct the 3D structure of scenes. However, these techniques rely the availability of multiple images of the same object from varying perspectives within the same scene, i.e., the coherence and consistency of the input images. These techniques may also rely on metadata, such as ground-truth camera pose information, to accurately interpret the scene's structure.

In some cases, image datasets contain a rich and diverse visual vocabulary (i.e., different textures, illuminations, shapes, environments, types of objects, and relationships). However, the abundance and variety of visual data in image datasets can cause difficulty when extracting 3D information. If a dataset is complex (e.g., includes images of the object in different environments, different materials, and with slight shape variations), conventional systems that use structure-from-motion techniques are not be able to extract 3D information.

Embodiments of the present disclosure are configured to handle diverse datasets by identifying robust keypoint correspondences between images of objects. The objects do not necessarily have to be the exact same object (e.g., they may be different makes of an office chair, a table, a desk, etc.), as the system can identify similarities between the shapes. The keypoint correspondence enables embodiments to correspond key parts of a shape across different images with varying backgrounds, colors, and textures. Some embodiments further initialize a camera representation based on the keypoint correspondence, which includes the camera's pose and intrinsic parameters such as focal length. Embodiments then predict an "occupancy field" which represents a prediction of the object's density at each point in the local space of the simulated camera. This prediction is optimized jointly with the camera representation to yield an accurate 3D shape. Accordingly embodiments improve upon image processing, and in particular, shape extraction, by enabling creators to mine 3D shape data from unstructured images such as large datasets.

An apparatus for mining 3D shape data from images is described with reference to FIGS. 1-5. Methods for extracting shape data are described with reference to FIGS. 6-8. A computing device configured to implement a shape extraction apparatus is described with reference to FIG. 9.
Shape Extraction System An apparatus for extracting shape data from images is described. One or more aspects of the apparatus include at least one processor; at least one memory including instructions executable by the at least one processor; an image encoder comprising parameters stored in the at least one memory and trained to generate image features for portions of a first image and portions of a second image, wherein the first image depicts an object and the second image includes a corresponding object having a same object category as the object; a keypoint extractor comprising parameters stored in the at least one memory and configured to identify a keypoint correspondence between a first keypoint in the first image and a second keypoint in the second image by clustering image features corresponding to the portions of the first image and the portions of the second image; and a machine learning model comprising parameters stored in the at least one memory and trained to generate a 3D model of the object based on the keypoint correspondence.

In some aspects, the image encoder is further configured to encode the first image and the second image to obtain a first image embedding and a second image embedding. Some examples of the apparatus, system, and method further include an image clustering component configured to cluster a plurality of images to obtain an image cluster corresponding to the same object category, wherein the first image and the second image are included in the image cluster. The clustering may be performed using the first image embedding and the second image embedding.

Some examples of the apparatus, system, and method further include a camera representation component configured to perform rigid factorization based on the keypoint correspondence to obtain an initial camera representation. Some examples further include an optimization component configured to perform a joint optimization on the initial camera representation and the 3D model.

Some examples of the apparatus, system, and method further include an augmentation component configured to modify the first image to obtain a modified first image. Some examples further include a mesh representation component configured to generate a mesh representation of the object based on the 3D model, wherein the 3D model comprises an occupancy field.

FIG. 1 shows an example of a shape extraction system according to aspects of the present disclosure. The example shown includes shape extraction apparatus 100, database 105, network 110, and user 115.

In an example process, user 115 queries a dataset by searching for an item such as "computer chair". The dataset, among other datasets, may be stored on database 105. Shape extraction apparatus 100 obtains unannotated images from database 105 based on the query. For example, the query may be used for a text-to-image multimodal search. Then, shape extraction apparatus 100 processes the images to identify similar shapes, and similar sub-shapes within shapes. This sub-shape correspondence is used to initialize camera parameters, and a path of light is simulated from the camera through a 3D space to sample positional encodings, which are input to a neural occupancy artificial neural network to produce a first iteration of an occupancy field. In some embodiments, the occupancy field is jointly refined with the camera parameters. The occupancy field is one way of encoding a 3D shape. In some cases, the occupancy field is converted to a 3D mesh (e.g., list of vertices) through, for example, cube-marching.

One or more components of shape extraction apparatus 100 is implemented on a server. A server provides one or more functions to users linked by way of one or more of the various networks, such as network 110. In some cases, the server includes a single microprocessor board, which includes a microprocessor responsible for controlling all aspects of the server. In some cases, a server uses microprocessor and protocols to exchange data with other devices/ users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Database 105 is configured to store data used by the shape extraction, such as datasets, user requests, model parameters, and the like. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

Network 110 facilitates the transfer of information between shape extraction apparatus 100, database 105, and user 115. Network 110 may be referred as a "cloud". A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, shape extraction apparatus 100 obtains a first image and a second image, where the first image depicts an object and the second image includes a corresponding object having a same object category as the object. In some aspects, the object includes a different instance of the object category than the corresponding object. For example, the object may be an office chair, and the corresponding object may be another office chair different from the first office chair. In some examples, shape extraction apparatus 100 obtains a set of images, including several images. Shape extraction apparatus 100 is an example of, or includes aspects of, the corresponding element described with reference to FIGS. 2 and 4.

Figure 2:
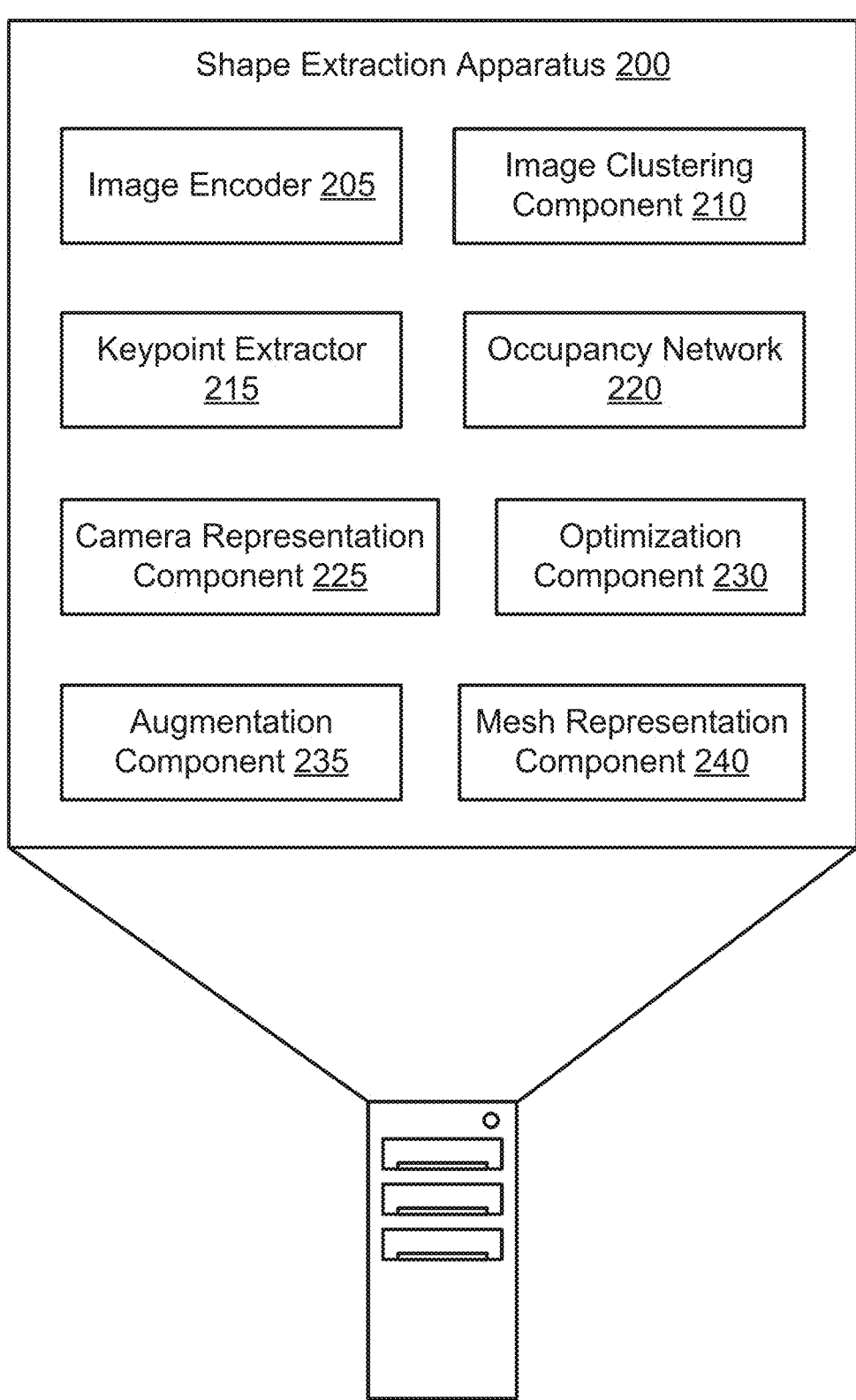
FIG. 2 shows an example of a shape extraction apparatus according to aspects of the present disclosure.

FIG. 2 shows an example of a shape extraction apparatus 200 according to aspects of the present disclosure. The example shown includes shape extraction apparatus 200, image encoder 205, image clustering component 210, keypoint extractor 215, occupancy network 220, camera representation component 225, optimization component 230, augmentation component 235, and mesh representation component 240. Shape extraction apparatus 200 is an example of, or includes aspects of, the corresponding element described with reference to FIGS. 1 and 4.

Embodiments of shape extraction apparatus 200 include several components and sub-components. These components are variously named, and are described so as to partition the functionality enabled by the processor(s) and the executable instructions included in the computing device used to implement shape extraction apparatus 200 (such as the computing device described with reference to FIG. 9). The partitions may be implemented physically, such as through the use of separate circuits or processors for each component, or may be implemented logically via the architecture of the code executable by the processors.

Some components of shape extraction apparatus 200 such as image encoder 205 and occupancy network 220 include models based on one or more artificial neural networks (ANNs). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Image encoder 205 is configured to embed images into an embedding space. The image embeddings include image features for each image. Some embodiments of image encoder 205 include a pre-trained vision transformer (ViT) such as DINO-ViT. DINO refers to the network's self-supervised training process that includes knowledge distillation with no labels. In some cases, features extracted using DINO-ViT enable efficient ability to distinguish foregrounds, perform part segmentation, and identify common keypoints between images.

According to some aspects, image encoder 205 generates image features for portions of the first image and portions of the second image. These portions may correspond to a set of locations in the first image and to a set of locations in the second image, respectively. In some examples, image encoder 205 encodes the first image and the second image to obtain a first image embedding and a second image embedding, respectively. In some examples, the first image and the second image are assigned to an image cluster based on the first image embedding and the second image embedding. Image encoder 205 is an example of, or includes aspects of, the corresponding element described with reference to FIG. 3.

Some embodiments of shape extraction apparatus 200 include a clustering step to group images that include similar objects. For example, in some embodiments, unlike the example of FIG. 1 where a dataset is queried with a text that indicates an object, shape extraction apparatus 200 operates automatically by parsing through an entire dataset including many different objects. Image clustering component 210 may then cluster images based on the similarity between the features extract from image encoder 205.

According to some aspects, image clustering component 210 clusters the set of images to obtain an image cluster corresponding to the same object category, where the first image and the second image are included in the image cluster. Image clustering component 210 is an example of, or includes aspects of, the corresponding element described with reference to FIG. 3.

Keypoint extractor 215 is configured to identify keypoints between images. Some embodiments of keypoint extractor 215 identify keypoints by performing k-means clustering on the image features from image encoder 205. In some cases, keypoint extractor 215 selects salient segments based on the k representative features, where the segments are selected based an unsupervised voting strategy. In some embodiments, keypoint extractor 215 computes bounding boxes for each segment in the image, and the center of the segment is set as the keypoint.

According to some aspects, keypoint extractor 215 identifies a keypoint correspondence between a first keypoint in the first image and a second keypoint in the second image by clustering the image features corresponding to the portions of the first image and the portions of the second image. Keypoint extractor 215 is an example of, or includes aspects of, the corresponding element described with reference to FIG. 3.

Occupancy network 220 is configured to predict an occupancy field based on the keypoint correspondence. Some embodiments of occupancy network include an n-layer multi-layer perceptron (MLP), which may be referred to generally as a machine learning model. An MLP is a feed forward neural network that typically includes multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters).

According to some aspects, occupancy network 220 generates a three-dimensional (3D) model of the object based on the keypoint correspondence. Occupancy network 220 is an example of, or includes aspects of, the corresponding element described with reference to FIG. 3. Additional detail regarding using the keypoint correspondence to generate a 3D model will be provided with reference to FIG. 3.

Camera representation component 225 is configured to generate initial camera parameters based on the keypoint correspondence. According to some aspects, camera representation component 225 performs rigid factorization based on the keypoint correspondence to obtain an initial camera representation, where the 3D model is based on the initial camera representation.

According to some embodiments, the occupancy field from occupancy network 220 is jointly optimized with the camera parameters. Camera representation component 225 is an example of, or includes aspects of, the corresponding element described with reference to FIG. 3.

Optimization component 230 is configured to jointly optimize the occupancy field and the camera parameters. According to some aspects, optimization component 230 generates a perspective camera representation based on the initial camera representation, where the initial camera representation includes an orthographic camera representation, and where the 3D model is generated based on the perspective camera representation. For example, the orthographic camera representation may include a matrix with zero values or extremely large values that approximate an orthographic camera. The joint optimization process may update these values so that they are representative of a perspective camera.

In some examples, optimization component 230 performs a joint optimization on the initial camera representation and the 3D model. In some examples, optimization component 230 updates parameters of the occupancy network 220 based on the joint optimization. For example, optimization component 230 may update parameters of the occupancy network 220 so that the resulting occupancy field (a type of 3D model representation) is more accurate. Optimization component 230 is an example of, or includes aspects of, the corresponding element described with reference to FIG. 3.

In some embodiments, parameters of the occupancy network 220 are updated based on a loss function that corresponds to object-silhouette supervision. An object silhouette may be obtained through, for example, a segmentation process based on the features extracted by image encoder 205. In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

Augmentation component 235 is configured to perform operations on input images such as color jittering, image rotation, and perspective transformation. According to some aspects, augmentation component 235 modifies the first image to obtain a modified first image, where the set of images input to the system includes the first image and the modified first image. Augmentation component 235 is an example of, or includes aspects of, the corresponding element described with reference to FIG. 3.

According to some aspects, mesh representation component 240 generates a mesh representation of the object based on the 3D model, where the 3D model includes an occupancy field. Some embodiments of mesh representation component 240 generate a mesh by performing a marching cube operation on the occupancy field. Mesh representation component 240 is an example of, or includes aspects of, the corresponding element described with reference to FIG. 3.

Figure 3:
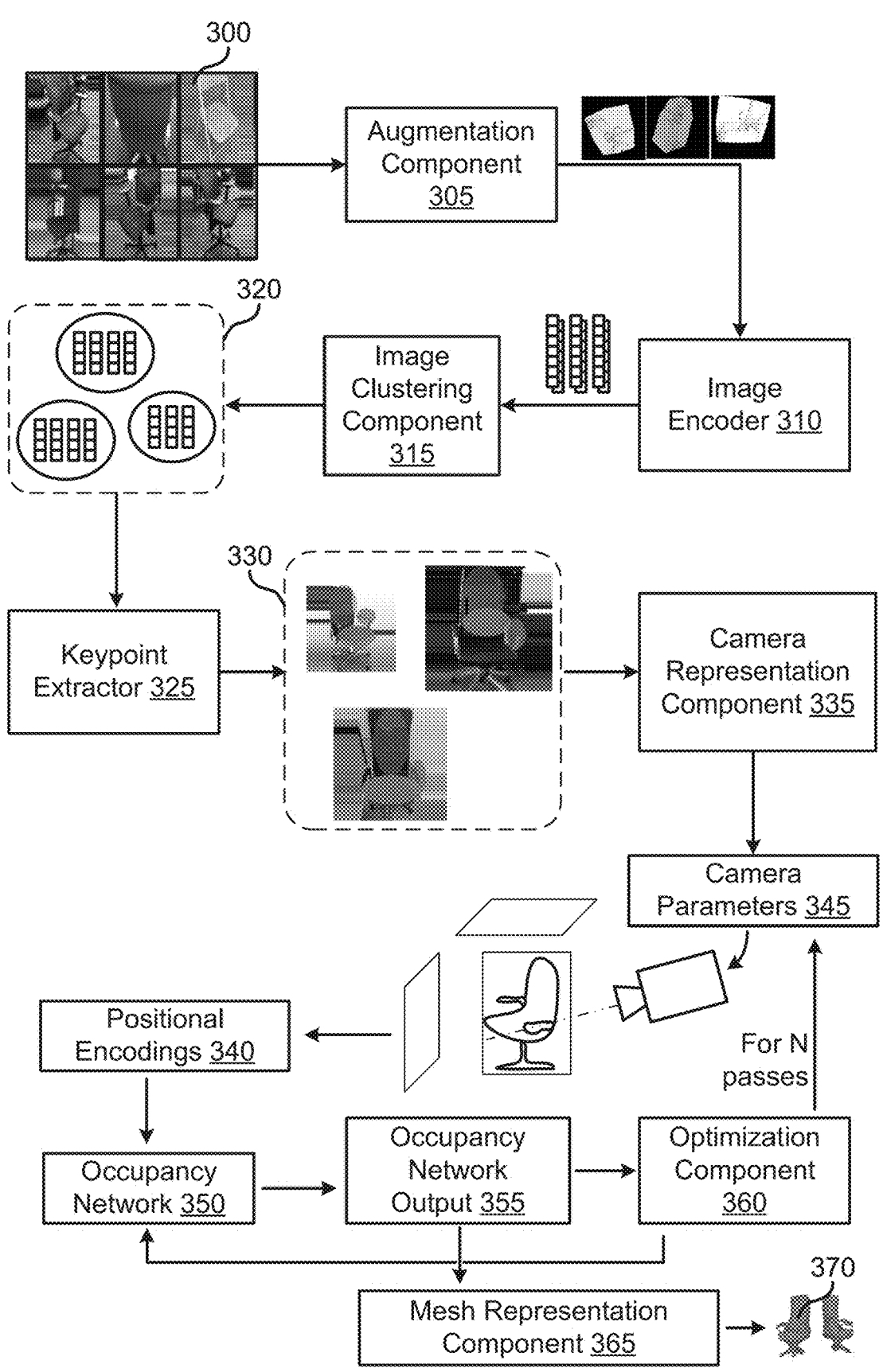
FIG. 3 shows an example of a pipeline for shape extraction according to aspects of the present disclosure.

FIG. 3 shows an example of a pipeline for shape extraction according to aspects of the present disclosure. The example shown includes dataset 300, augmentation component 305, image encoder 310, image clustering component 315, image clusters 320, keypoint extractor 325, keypoints within cluster 330, camera representation component 335, positional encodings 340, camera parameters 345, occupancy network 350, occupancy network output 355, optimization component 360, mesh representation component 365, and 3D shape 370. The components shown in FIG. 3 may be examples of, or include aspects of, the similarly named components described with reference to FIG. 2.

In the example shown, augmentation component 305 performs one or more transformations to the images from dataset 300. Transformations may include color jittering, rotations, various affine transforms, at the like. In one example, the image processing system obtains a set of augmented DINO-ViT features $S_I = \{f(A_1(I)), \ldots, f(A_n(I))\}$ for a given image I using image encoder 310, where $A_i$ refers to a random set of augmentations involving color jittering, image rotation, and perspective transformation, and $f(\cdot)$ is a pretrained DINO-ViT outputting a per-image global feature. The final feature of the image $z_I$ is then computed as:

$$z_I = [\max(S_I), \text{mean}(S_I), \min(S_I)] \tag{1}$$

In some cases, color jittering makes the resulting feature more invariant to texture and illumination conditions. Rotation and perspective transformations are used to change viewpoints in 3D. The augmentations enable the features to be based on the geometry of the shapes within the images.

Using the feature $z_I$, image clustering component 315 performs a bottom-up agglomerative clustering to generate image clusters 320. Keypoint extractor 325 identifies keypoints to generate keypoints within cluster 330. Keypoints are segments of an image that indicate parts of a shape within an image cluster. For example, if the shape is an office chair, there may be a keypoint for each arm rest, for the back of the chair, its seat, etc. The keypoint may comprise a bounding box of the segment and the bounding box's centroid.

Camera representation component 335 processes keypoints within cluster 330 to generate an initial camera representation of the scene and object shown in the image, as well as camera parameters 345. Camera parameters may include extrinsic parameters such as pose and intrinsic parameters such as focal length. In some cases, a matrix factorization method is used to estimate orthographic poses from a sequence of images and corresponding keypoints. The matrix factorization method is robust to noise in the keypoints and does not require that all images contain all keypoints. According to some examples, camera representation component 335 performs rigid factorization through SVD and Stiefel manifold projections to obtain an orthographic camera for each image I in an image cluster:

$$p_{2d} = M \cdot p_{3d} + t \tag{2}$$

where $M \in \mathbb{R}^{2 \times 3}$ and $t \in \mathbb{R}^{2 \times 1}$ are the orthographic motion and translation matrix to project a 3D point $p_{3d}$ to a 2D point $p_{2d}$ on the image plane of I.

Thus far, the shape extraction system has generated an image cluster that includes a geometric shape, as well as a pose for every image within the cluster. Applying conventional NN based methods to extract shape data does not work, since there is no photo-consistency between images in the cluster due to the differences in textures and backgrounds. Accordingly, embodiments are configured to predict an occupancy field using silhouette images as supervision rather than the entire RGB image. In some examples, the shape extraction system uses an intermediate supervision baseline including feature-level and mask-level guidance for image segmentation model training (e.g., IS-Net) to perform foreground segmentation in each image to extract the silhouettes. Then, embodiments perform bundle adjustments to jointly optimize the occupancy field and the camera parameters from Equation (2).

Embodiments use the orthographic parameters from camera parameters 345 to initialize a perspective camera-to-world matrix P uses the orthographic parameters from M to initialize a perspective camera-to-world matrix P in $\mathbb{R}^{4 \times 4}$ for each image:

$$P = \begin{bmatrix} \dfrac{m_1}{\|m_1\|} & | \\ \dfrac{m_2 - (p_1 \cdot m_2)p_1}{\|m_2 - (p_1 \cdot m_2)p_1\|} & T \\ p_1 \times p_2 & 1 \\ 0 & \end{bmatrix}^{-1} \tag{3}$$

where $m_i$ and $p_i$ denote the $i^{th}$ row of M and P, respectively. In some cases, the top-left sub-matrix $P_{[1:3, 1:3]}$ is the rotation matrix controlling the camera viewing direction, while M, the orthographic projection matrix, is a $\mathbb{R}^{2 \times 3}$ matrix formed by two orthogonal 3D vector and can be interpreted as a linear plane of projection. The rotation corresponding to M is obtained by applying Gram-Schmidt orthonormalization process for the first two rows and getting the cross product for the third row. Note that M, estimated by Rigid Factorization, is initially orthogonal. Thus, $P_{[1:2, 1:3]}$ is set to be a normalized version of M. In some cases, M is optimized via gradient descent, and thus, M may not be orthonormal throughout the process. Hence, Gram-Schmidt orthonormalization is performed to ensure the orthonormality of M. T is a translation vector initialized as $[0, 0, z]^T$, where z is a scalar hyperparameter (e.g., z=5). In some cases, the image processing system initializes a camera intrinsic matrix K with focal length f equal to the image size. The initialization is optimized during the bundle-adjustment.

Given K and P, camera representation component 335 simulates a camera by casting rays from the camera's estimated position for each image to each pixel, and samples points along each ray r to generate positional encodings 340. For example, Each point x is encoded with a progressive positional encoding technique where the $k^{th}$ frequency of the positional encoding is:

$$\gamma(x, \alpha) = w(\alpha) \cdot \left[\cos 2^k \pi x, \sin 2^k \pi x\right] \tag{4}$$

where w is a weight controlled by hyperparameter $\alpha$ that gradually increases as the training progresses. Thus, the encoding of high frequencies is activated as training progresses.

Positional encodings 340 are input to occupancy network 350 to predict an occupancy field as occupancy network output 355. Optimization component 360 adjusts parameters of occupancy network 350 using the shape silhouettes described above as supervision. For example, some embodiments of optimization component 360 compute a binary cross-entropy comparing the ground-truth silhouettes occupancy $o_{gt}$ and the soft maximum occupancy of the corresponding ray:

$$\mathcal{L}_r = BCE\left(o_{gt}, 1 - e^{\left(-\Sigma_{x \in r} MLP\left(x, [\gamma(x, \alpha)]_{\alpha=0}^{10}\right)\right)}\right) \tag{5}$$

Optimization component 360 jointly optimizes occupancy network 350 and camera parameters 345 including parameters f, M, and Ts for each image according to the loss from Equation 5. In some cases, the optimization component 360 does not directly optimize the matrix P via gradient descent to ensure that P remains in the manifold of rotation matrices.

According to some embodiments, optimization component 360 may jointly optimize occupancy network 350 and camera parameters 345 via, for example, gradient descent until a computed loss function is beneath a threshold or until some other condition is met. The last version of the predicted occupancy field may be used as the 3D model. Some embodiments further include a mesh representation component 365 configured to create a mesh representation of the 3D model. For example, the mesh representation component 365 may process the occupancy field by performing a marching cube operation to extract a mesh.

Some embodiments perform additional optimization on the 3D shape by including regularization measures during the optimization process. Some embodiments include an additional geometric regularizer $\mathcal{L}_g$ for piece-wise smoothness of objects:

$$\mathcal{L}_g = (d(r_{i,j}) - d(r_{i,j+1}))^2 + (d(r_{i,j}) - d(r_{i+1,j}))^2 \qquad (6)$$

where $r_{i,j}$ indicates the ray casted from pixel coordinate (i,j) and d is expected depth. Embodiments may further perform space annealing to confine the near and far plane (since the reconstructed shapes can be placed at the center of the coordinate system) and then gradually expand the planes as training progresses.

Figure 4:
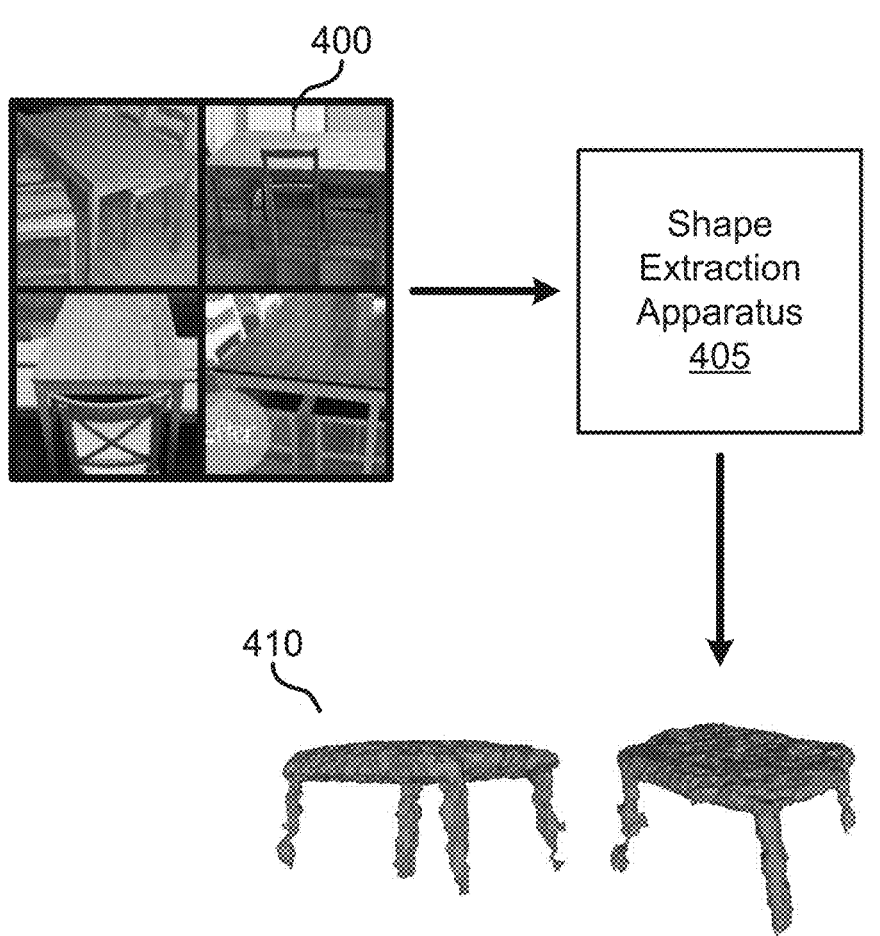
FIG. 4 shows an example of a simplified pipeline for shape extraction according to aspects of the present disclosure.

FIG. 4 shows an example of a simplified pipeline for shape extraction according to aspects of the present disclosure. The example shown includes plurality of images of a desk 400, shape extraction apparatus 405, and desk shape 410. Shape extraction apparatus 405 is an example of, or includes aspects of, the corresponding element described with reference to FIGS. 1 and 2.

FIG. 4 illustrates an example of shape extraction using shape apparatus 405. A plurality of images of a desk 400 may be input to shape extraction apparatus 405. Shape extraction apparatus 405 extracts desk shape 410 therefrom using the techniques described with reference to FIGS. 2 and 3. As shown in the Figure, the images may include images of different tables with different types of wood, numbers of chairs in the background, etc., yet the system may extract a desk shape 410 that is representative of the desks from all of the images.

Figure 5:
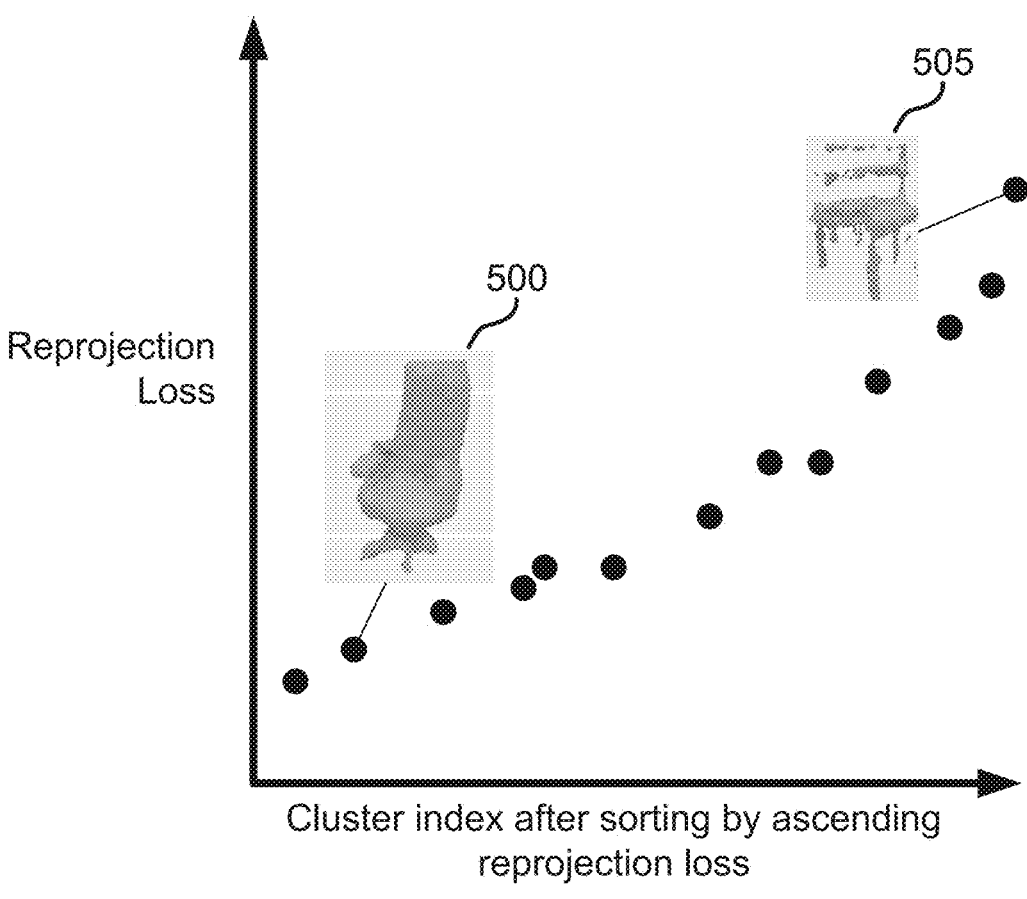
FIG. 5 shows an example of a filtering process according to aspects of the present disclosure.

FIG. 5 shows an example of a filtering process according to aspects of the present disclosure. The example shown includes extracted shape data with low reprojection error 500 and extracted shape data with high reprojection error 505.

Reprojection error represents the difference between an object's silhouette and the predicted occupancy field as described with reference to FIG. 3. It is the final converged loss from Equation 5. FIG. 5 illustrates a graph that plots the averaged reprojection error per image as measured by comparing each image to the representative rendered mesh for each image cluster. This particular graph represents all clusters corresponding to chairs in a large unannotated dataset. As shown in the Figure, extracted shape data with low reprojection error 500 has a more cohesive chair shape than extracted shape data with high reprojection error 505. In some embodiments, the shape extraction system keeps extracted shape data below a threshold reprojection error such as 0.4, and discards extracted shape data above the threshold.

Shape Extraction

A method for extracting shape data from images is described. One or more aspects of the method include obtaining a first image and a second image, wherein the first image depicts an object and the second image includes a corresponding object having a same object category as the object; generating, using an image encoder, image features for portions of the first image and for portions of the second image; identifying a keypoint correspondence between a first keypoint in the first image and a second keypoint in the second image by clustering the image features corresponding to the portions of the first image and the portions of the second image; and generating, using an occupancy network, a three-dimensional (3D) model of the object based on the keypoint correspondence.

In some aspects, the object comprises a different instance of the object category than the corresponding object. For example, the object may be an office chair, and the corresponding object may be a different office chair.

Some examples of the method, apparatus, non-transitory computer readable medium, and system further include obtaining a plurality of images. Some examples further include clustering the plurality of images to obtain an image cluster corresponding to the same object category, wherein the first image and the second image are included in the image cluster.

Some examples of the method, apparatus, non-transitory computer readable medium, and system further include encoding the first image and the second image to obtain a first image embedding and a second image embedding, respectively, wherein the image cluster is obtained based on the first image embedding and the second image embedding. Some examples further include modifying the first image to obtain a modified first image, wherein the plurality of images includes the first image and the modified first image. The modifications may include color jittering, image rotation, and perspective transformation.

Some examples of the method, apparatus, non-transitory computer readable medium, and system further include performing rigid factorization based on the keypoint correspondence to obtain an initial camera representation, wherein the 3D model is based on the initial camera representation. Some examples further include generating a perspective camera representation based on the initial camera representation, wherein the initial camera representation comprises an orthographic camera representation, and wherein the 3D model is generated based on the perspective camera representation.

Some examples of the method, apparatus, non-transitory computer readable medium, and system further include performing a joint optimization on the initial camera representation and the 3D model. Some examples further include updating parameters of the occupancy network based on the joint optimization.

Some examples of the method, apparatus, non-transitory computer readable medium, and system further include generating a mesh representation of the object based on the 3D model, wherein the 3D model comprises an occupancy field. The mesh representation may be generated by, for example, simulating a marching cube over the occupancy field space. The marching cube may correspond to a 3D convolution operation.

Figure 6:
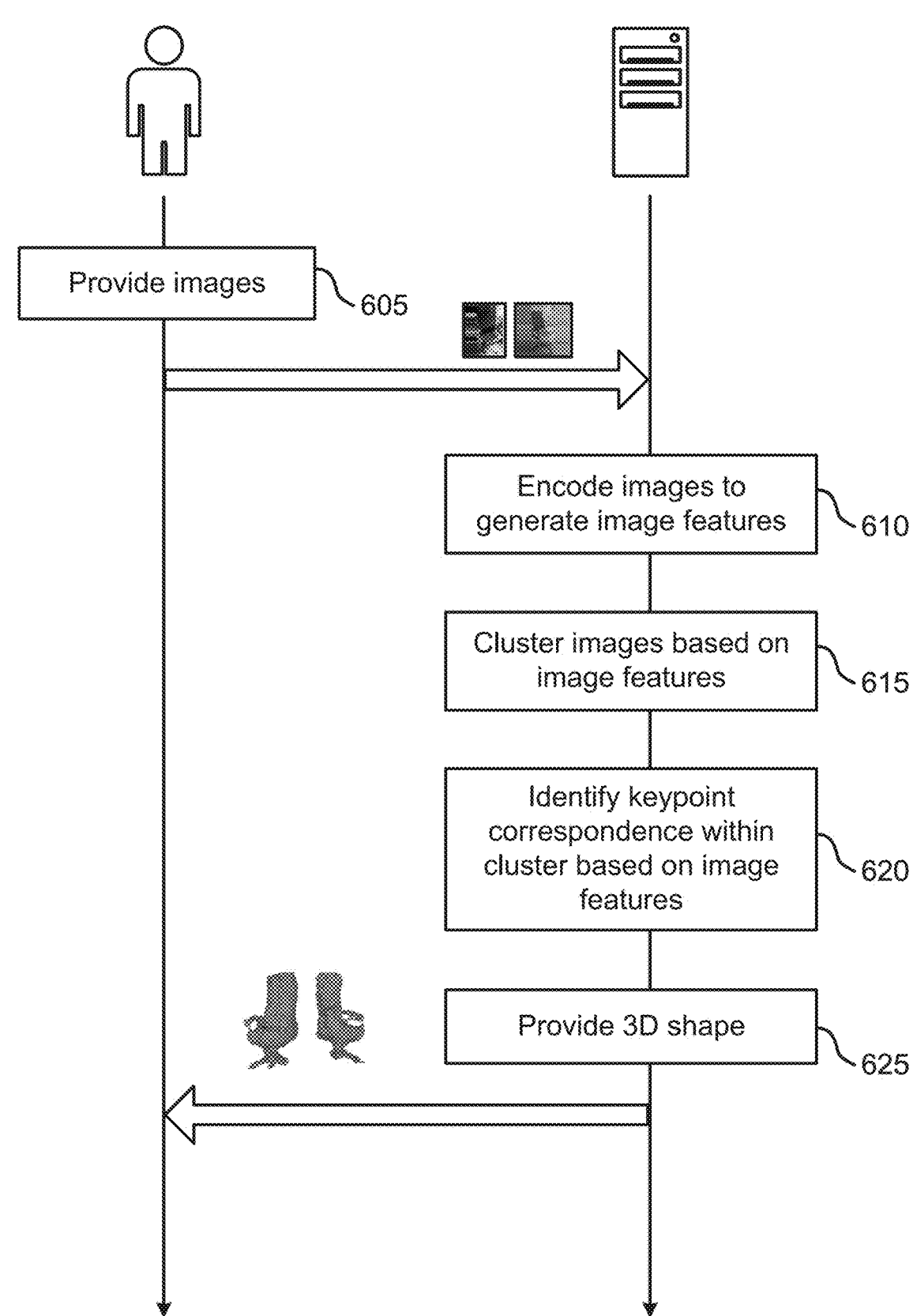
FIG. 6 shows an example of a method for providing 3D shape data to a user according to aspects of the present disclosure.

FIG. 6 shows an example of a method 600 for providing 3D shape data to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user provides images. The user may, for example, point to a dataset that includes images from which the user wishes to extract shape data. In some embodiments, a user queries a search tool configured to search a dataset based on a text prompt. The user may wish to generate a shape of an office chair, for example, and accordingly may query the tool for "office chair", and provide the resulting images to the system.

At operation 610, the system encodes the images to generate image features. The system may do so using an image encoder as described with reference to FIGS. 2-3. The image encoder may be based on, for example, a DINO-ViT model.

At operation 615, the system clusters the images based on the image features. For example, if the user did not provide the "office chair" query, or if the provided images were numerous, then the system may cluster the input images into clusters that contain the shape of one object. The clustering may be executed by performing k-means clustering on the image features.

At operation 620, the system identifies a keypoint correspondence within the cluster based on image features. For example, the system may identify the keypoints according to the process described with reference to FIG. 3.

At operation 625, the system provides the extracted 3D shape. The system may provide the 3D shape to a user via a user interface, or may provide the 3D shape to a database and store it for later use.

FIG. 7 shows an example of a method 700 for generating a 3D model from images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The following example describes a case in which an image cluster includes two images that describe a shape. However, embodiments are not limited thereto, and some embodiments may process many thousands of images to generate many clusters corresponding to different shapes, where each cluster has several images.

At operation 705, the system obtains a first image and a second image, where the first image depicts an object and the second image includes a corresponding object having a same object category as the object. In some cases, the operations of this step refer to, or may be performed by, a shape extraction apparatus as described with reference to FIGS. 1, 2, and 4. The images may be from a large unordered dataset, and may have different colors, textures, and backgrounds.

At operation 710, the system generates, using an image encoder, image features for each of a set of locations in the first image and for each of a set of locations in the second image. Different portions of the first image may correspond to each of the set of locations in the first image, and similarly for the second image. For example, the system may generate image features for patches of the first image and the second image, where the patches are a predetermined size such as 12×12, 16×16, or some other size. In some cases, the operations of this step refer to, or may be performed by, an image encoder as described with reference to FIGS. 2 and 3. In at least one embodiment, the image encoder encodes features for each pixel of each image. In some cases, the features for each pixel of each image are encoded independently.

At operation 715, the system identifies a keypoint correspondence between a first keypoint in the first image and a second keypoint in the second image by clustering the image features across the first image and the second image. In some cases, the operations of this step refer to, or may be performed by, a keypoint extractor as described with reference to FIGS. 2 and 3. Some embodiments identify keypoints according to a hyperparameter that dictates the number of keypoints that should be extracted. In some embodiments, this is 8 keypoints per cluster, though embodiments are not necessarily limited thereto.

At operation 720, the system generates, using an occupancy network, a three-dimensional (3D) model of the object based on the keypoint correspondence. In some cases, the operations of this step refer to, or may be performed by, an occupancy network as described with reference to FIGS. 2 and 3. The 3D model may be encoded within an occupancy field that includes a value for an object density at each point in the occupancy field space. Some embodiments further process the occupancy field to extract a 3D mesh representation of the 3D model.

FIG. 8 shows an example of a method 800 for estimating a 3D shape from images using an occupancy network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a keypoint correspondence between images. The operations of this step refer to, or may be performed by, a keypoint extractor as described with reference to FIGS. 2 and 3.

At operation 810, the system initializes a camera pose and other parameters from keypoint correspondence. The operations of this step refer to, or may be performed by, a camera representation component as described with reference to FIGS. 2 and 3 according to the process described with reference to Equation 2.

At operation 815, the system simulates a camera by casting rays from the camera in a 3D space through images, and sampling points along the ray to obtain positional encodings. The 3D space and the camera may be unique to each image in a cluster. The sampling may be performed according to the process described with reference to FIG. 3 and Equation 4.

At operation 820, the system inputs the positional encodings to an occupancy network to predict an occupancy field. The occupancy field may include a representation of the 3D model as a set of points describing the density of the object in 3D space.

At operation 825, the system compares predicted occupancy field to ground-truth object silhouette in image. The system may do so according to the process and loss function described with reference to FIG. 3 and Equation's 5-6.

At operation 830, the system jointly optimizes camera parameters and occupancy field based on comparison. For example, the system may use the loss function described with reference to FIG. 3 and Equation's 5-6 and perform gradient descent to adjust parameters of the occupancy network. In this way, the output occupancy field is updated to produce a more accurate 3D shape.

Figure 9:
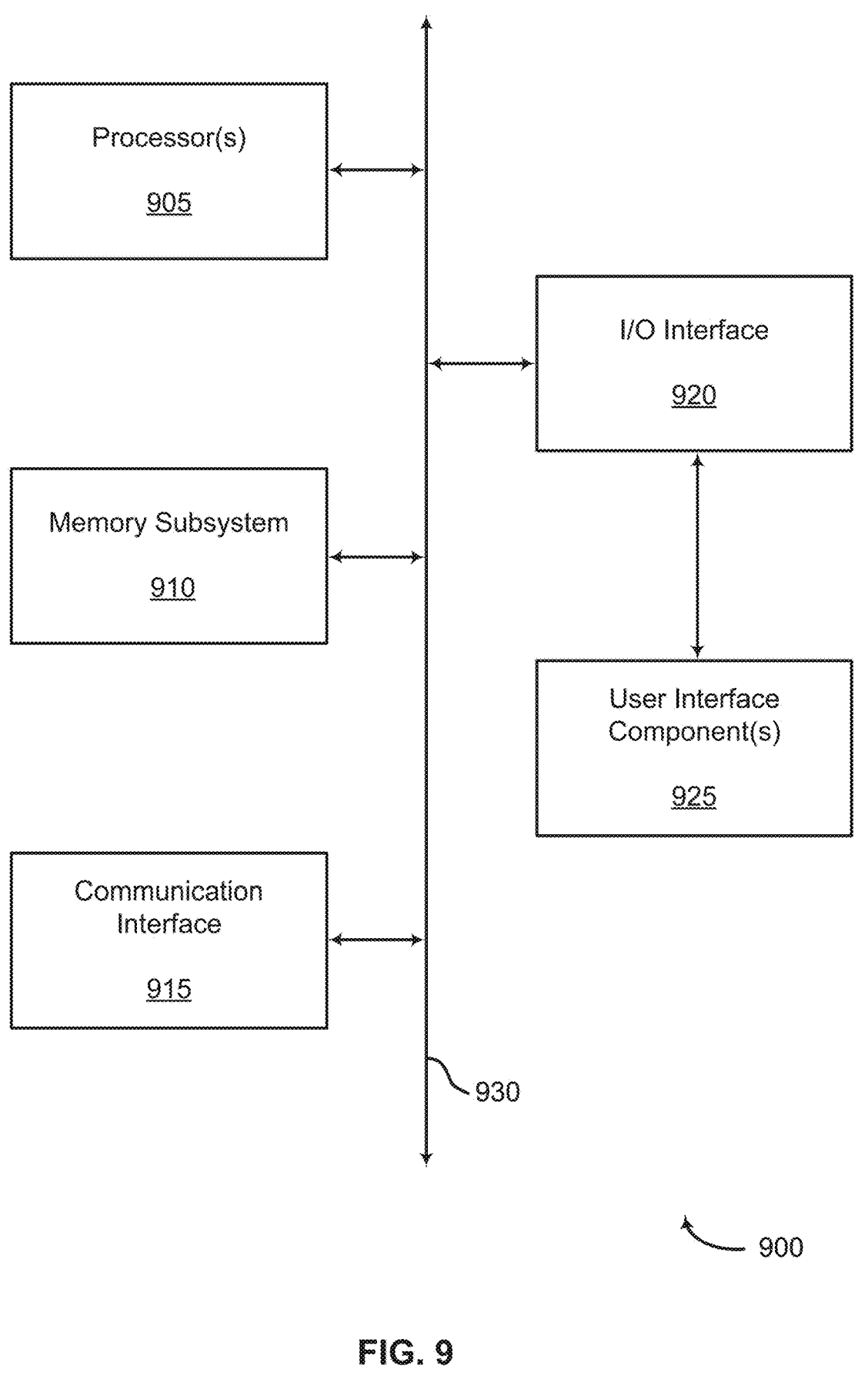

FIG. 9 shows an example of a computing device 900 according to aspects of the present disclosure. The example shown includes computing device 900, processor(s), memory subsystem 910, communication interface 915, I/O interface 920, user interface component(s), and channel 930.

In some embodiments, computing device 900 is an example of, or includes aspects of, shape extraction apparatus 100 of FIG. 1. In some embodiments, computing device 900 includes one or more processors 905 are configured to execute instructions stored in memory subsystem 910 to obtain a first image and a second image, wherein the first image depicts an object and the second image includes a corresponding object having a same object category as the object; generate, using an image encoder, image features for portions of the first image and for portions of the second image; identify a keypoint correspondence between a first keypoint in the first image and a second keypoint in the second image by clustering the image features corresponding to the portions of the first image and the portions of the second image; and generate, using an occupancy network, a three-dimensional (3D) model of the object based on the keypoint correspondence.

According to some aspects, computing device 900 includes one or more processors 905. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 915 operates at a boundary between communicating entities (such as computing device 900, one or more user devices, a cloud, and one or more databases) and channel 930 and can record and process communications. In some cases, communication interface 915 is provided to enable a processing system coupled to a transceiver (e.g., a transmitter and/or a receiver). In some examples, the transceiver is configured to transmit (or send) and receive signals for a communications device via an antenna.

According to some aspects, I/O interface 920 is controlled by an I/O controller to manage input and output signals for computing device 900. In some cases, I/O interface 920 manages peripherals not integrated into computing device 900. In some cases, I/O interface 920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 920 or via hardware components controlled by the I/O controller.

According to some aspects, user interface component(s) 925 enable a user to interact with computing device 900. In some cases, user interface component(s) 925 include an audio device, such as an external speaker system, an external display device such as a display screen, an input device (e.g., a remote control device interfaced with a user interface directly or through the I/O controller), or a combination thereof. In some cases, user interface component(s) 925 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a plurality of images representing a plurality of object categories, wherein the plurality of images includes a first image and a second image belonging to an object category, and wherein the first image depicts an object in the object category and the second image depicts a different object having the same object category;
clustering the plurality of images to obtain an image cluster corresponding to the object category, wherein the image cluster includes the first image and the second image;
generating, using an image encoder, a plurality of image feature vectors including a first plurality of image feature vectors and a second plurality of image feature vectors based on the image cluster, wherein the first plurality of image feature vectors correspond to a plurality of portions of the first image, respectively, and the second plurality of image feature vectors correspond to a plurality of portions of the second image, respectively;
clustering the plurality of image feature vectors to obtain a first image feature vector of the first plurality of image feature vectors corresponding to a second image feature vector of the second plurality of image feature vectors, wherein the first image feature vector corresponds to a portion of the first image and the second image feature vector corresponds to a portion of the second image, and wherein the first image feature vector and the second image feature vector represent an object part corresponding to the object category;
identifying a keypoint correspondence between a first keypoint in the first image and a second keypoint in the second image based on the clustering of the plurality of image feature vectors; and
generating, using a machine learning model, a three-dimensional (3D) model of the object based on the keypoint correspondence.

2. The method of claim 1, further comprising:
encoding the first image and the second image to obtain a first image embedding and a second image embedding, respectively, wherein the image cluster is obtained based on the first image embedding and the second image embedding.

3. The method of claim 1, further comprising:
modifying the first image to obtain a modified first image, wherein the plurality of images includes the first image and the modified first image.

4. The method of claim 1, further comprising:
performing rigid factorization based on the keypoint correspondence to obtain an initial camera representation, wherein the 3D model is based on the initial camera representation.

5. The method of claim 4, further comprising:
generating a perspective camera representation based on the initial camera representation, wherein the initial camera representation comprises an orthographic camera representation, and wherein the 3D model is generated based on the perspective camera representation.

6. The method of claim 4, further comprising:
performing a joint optimization on the initial camera representation and the 3D model.

7. The method of claim 6, further comprising:
updating parameters of the machine learning model based on the joint optimization.

8. The method of claim 1, further comprising:
generating a mesh representation of the object based on the 3D model, wherein the 3D model comprises an occupancy field.

9. A non-transitory computer readable medium storing code, the code comprising instructions executable by a processor to:
obtain a plurality of images representing a plurality of object categories, wherein the plurality of images includes a first image and a second image belonging to an object category, and wherein the first image depicts an object in the object category and the second image depicts a different object having the same object category;
cluster the plurality of images to obtain an image cluster corresponding to the object category, wherein the image cluster includes the first image and the second image;
generate, using an image encoder, a plurality of image feature vectors including a first plurality of image feature vectors and a second plurality of image feature vectors based on the image cluster, wherein the first plurality of image feature vectors correspond to a plurality of portions of the first image, respectively, and the second plurality of image feature vectors correspond to a plurality of portions of the second image, respectively;
cluster the plurality of image feature vectors to obtain a first image feature vector of the first plurality of image feature vectors corresponding to a second image feature vector of the second plurality of image feature vectors, wherein the first image feature vector corresponds to a portion of the first image and the second image feature vector corresponds to a portion of the second image, and wherein the first image feature vector and the second image feature vector represent an object part corresponding to the object category;

identify a keypoint correspondence between a first keypoint in the first image and a second keypoint in the second image based on the clustering of the plurality of image feature vectors; and generate, using a machine learning model, a three-dimensional (3D) model of the object based on the keypoint correspondence.

10. The non-transitory computer readable medium of claim 9, wherein the code further comprises instructions executable by the processor to:

perform rigid factorization based on the keypoint correspondence to obtain an initial camera representation, wherein the 3D model is based on the initial camera representation.

11. An apparatus comprising:

at least one processor;

at least one memory including instructions executable by the at least one processor;

the apparatus further comprising:

an image clustering component configured to cluster a plurality of images to obtain an image cluster corresponding to an object category, wherein the plurality of images represent a plurality of object categories, and wherein the plurality of images includes a first image and a second image belonging to the object category, and wherein the first image depicts an object in the object category and the second image depicts a different object having the same object category;

an image encoder comprising parameters stored in the at least one memory and trained to generate a plurality of image feature vectors including a first plurality of image feature vectors and a second plurality of image feature vectors based on the image cluster, wherein the first plurality of image feature vectors correspond to a plurality of first portions of the first image, respectively, and the second plurality of image feature vectors correspond to a plurality of portions of the second image, respectively;

a keypoint extractor comprising parameters stored in the at least one memory and configured to identify a keypoint correspondence between a first keypoint in the first image and a second keypoint in the second image by clustering the plurality of image feature vectors to obtain a first image feature vector of the first plurality of image feature vectors corresponding to a second image feature vector of the second plurality of image feature vectors, wherein the first image feature vector corresponds to a portion of the first image and the second image feature vector corresponds to a portion of the second image, and wherein the first image feature vector and the second image feature vector represent an object part corresponding to the object category; and a machine learning model comprising parameters stored in the at least one memory and trained to generate a 3D model of the object based on the keypoint correspondence.

12. The apparatus of claim 11, wherein:

the image encoder is further configured to encode the first image and the second image to obtain a first image embedding and a second image embedding.

13. The apparatus of claim 11, further comprising:

a camera representation component configured to perform rigid factorization based on the keypoint correspondence to obtain an initial camera representation.

14. The apparatus of claim 11, further comprising:

an optimization component configured to perform a joint optimization on the initial camera representation and the 3D model.

15. The apparatus of claim 11, further comprising:

an augmentation component configured to modify the first image to obtain a modified first image.

16. The apparatus of claim 11, further comprising:

a mesh representation component configured to generate a mesh representation of the object based on the 3D model, wherein the 3D model comprises an occupancy field.

* * * * *